United States Patent [19]
Baumann et al.

[11] 4,388,458
[45] Jun. 14, 1983

[54] USE OF ULTRASONIC ENERGY TO IMPROVE NITROCELLULOSE PURIFICATION

[75] Inventors: Robert P. Baumann, Mine Hill; Marcel Blais, Newton; Irwin Spiess, Pequannock, all of N.J.

[73] Assignee: The United States of America as represented by the Secretary of the Army, Washington, D.C.

[21] Appl. No.: 334,118

[22] Filed: Dec. 24, 1981

[51] Int. Cl.³ .............................................. C08B 5/04
[52] U.S. Cl. ...................................... 536/38; 149/100; 536/35
[58] Field of Search ...................................... 536/38, 35

[56] References Cited

U.S. PATENT DOCUMENTS

| | | | |
|---|---|---|---|
| 3,057,012 | 10/1962 | Lufkin | 264/175 |
| 3,456,357 | 7/1969 | Griffith | 34/28 |
| 4,138,535 | 2/1979 | Schweiser | 536/43 |
| 4,334,060 | 6/1982 | Blais | 536/38 |

*Primary Examiner*—A. Lionel Clingman
*Attorney, Agent, or Firm*—Robert P. Gibson; Anthony T. Lane; A. Victor Erkkila

[57] ABSTRACT

The instant invention relates to a process for removing trace sulfuric acid from nitrocellulose fibers by dispersing the fibers in water and then subjecting them to ultrasonic energy for a time period and at an energy level sufficient to enhance the nitrocellulose fibers contact with water and facilitate sulfuric acid dispersal in the water. The waste water containing the traces of sulfuric acid contaminant from the nitrocellulose fibers is removed and the purified nitrocellulose fibers recovered.

3 Claims, No Drawings

USE OF ULTRASONIC ENERGY TO IMPROVE NITROCELLULOSE PURIFICATION

The invention described herein may be manufactured, used and licensed by or for the Government for governmental purposes without the payment to us of any royalties thereon.

BACKGROUND OF THE INVENTION

1. Field of the Invention

This invention relates to a process for use in the purification of nitrocellulose, and more particularly to a treatment of the fibrous nitrocellulose product which treatment facilitates removal of traces of sulfuric acid.

2. Brief Description of the Prior Art

Nitrocellulose is presently made by reacting a cellulose feed stock such as cotton linters or wood pulp, with a mixture of nitric and sulfuric acids. The nitric acid reacts with the cellulose, causing nitrate radicals to replace hydroxyl radicals and forming water as a reaction product. This is a reversible reaction, thus:

$$R-OH + HNO_3 \rightleftarrows R-NO_3 + H_2O$$

Normally, the reaction would not proceed far enough to yield a highly nitrated product, but the sulfuric acid introduced with the nitric acid takes up the water formed and permits the reaction to proceed to the desired degree. After the nitration has been performed, it is necessary to purify the nitrocellulose by removing the sulfuric acid entrapped in the fibrous product. If it is not removed, the nitrocellulose will not be stable, but rather will break down with the evolution of heat and fumes ultimately resulting in explosion, fire, or at least severe deterioration of the nitrocellulose. Thus, manufacture of nitrocellulose based materials such as propellants and explosives with long shelf lives is highly dependent on purification and stabilization with thorough removal of sulfuric acid traces.

The purification system commonly used today is a batch operation involving lengthy boiling and poaching operations. The process requires the consumption of large quantities of heat energy, steam and water and the equipment used in carrying out the process requires housing in a large and costly plant facility.

DESCRIPTION OF THE PREFERRED EMBODIMENTS

The three techniques which can be used to treat the nitrocellulose fibers are: 1. fiber swelling; 2. pressure digestion; and 3. attrition.

Fiber swelling involves the pretreatment of the raw nitrocellulose with a water-acetone mixture. Swelling of the fiber will open the nitrocellulose structure and permit the trapped sulfuric acid to be removed more easily during the boiling and poaching processes. This technique will involve some additional expense in requiring the use of acetone with its accompanying fire/explosion, pollution and health hazards and the difficulty of recovering acetone, but may offer overall improvement on balance.

Pressure digestion involves the use of higher temperatures and pressures in either batch or continuous operations. This will facilitate removal of sulfuric acid, but treatment with high temperatures and pressures is known to reduce the viscosity of nitrocellulose. This factor degrades the product and makes the process difficult to control. It may also necessitate the use of higher viscosity cellulose feed stock in the nitration process to overcome this difficulty, if such feed stock is obtainable and practical to use.

The attrition process involves the use of special mills to reduce the tubular fibers to very small size or to open the tubes thereof, permitting the sulfuric acid to be more easily reached and removed. It is not known whether this approach is practical by itself, however, it can be used to improve the efficiency of another approach.

According to the present invention, ultrasonic energy is employed to enhance the nitrocellulose purification process. The ultrasonic activation produces very intimate surface actions, greatly enhancing operations such as agitation, mixing and penetration down to extremely small sizes. These effects will make possible greatly improved efficiency of acid removal in any or all of the procedures described above to improve nitrocellulose purification.

Ultrasonic activation of the fibers facilitates movement of sulfuric acid particles through the fibers, improves intimacy of contact of the fibers with the water medium, facilitates movement of the sulfuric acid particles through the interface of the fiber and the water medium and facilitates surfuric acid dispersal in the water medium. In the case of solvent swelling, it will also facilitate the contact of the solvent with the fiber and its dispersal therein, thus improving fiber swelling. The main effect expected from the attrition approach is that size reduction and opening of the tubular fibers will facilitate contact of fibers with the water medium. This will be further improved by ultrasonic activation. In the case of pressure digestion, the application of higher temperatures and pressures improve contact of the water medium with the fibers, promotes fiber penetration and improves dispersal of the sulfuric acid. All of these effects will be enhanced by ultrasonic activation.

As a result of applying ultrasonic activation to the improved purification process technique, the following beneficial effects may be expected:

a. In the case of solvent swelling, less solvent will be required and also a reduction in processing facility size and dwell time will be achieved. Solvent recovery costs will be reduced. Hazards will be directly reduced by size and quantity reduction.

b. In the case of pressure digestion, the desired purification can be attained with decreased temperature, pressure and/or dwell time; thus greatly diminishing the adverse effect on product viscosity and facilitating process control. Consequently, the viscosity of the cellulose feed stock need not be as high as would otherwise be required to achieve the desired product viscosity.

The enhanced purification technique serves to decrease the quantity of waste water contaminated with dilute sulfuric acid which must be discarded, since the improved process reduces the amount of effluent water produced.

The process can employ one or more electromagnetically driven piezoelectric transducers inserted into existing batch purification vessels, continuous purification vessels or pipe sections. The transducers can operate over a range of up to about 100 KW of acoustic power. The power level and the number and placement of transducers is selected based upon primarily the degree of nitration of the nitrocellulose and the source of the cellulose used in nitration. Operating temperatures can be varied from approximately room temperature to about 140° F. and operating pressures can range from ambient pressure to 10 to 15 atmospheres. The contact of the process fluid, stream or liquor with the transducer(s) can be controlled by the number and placement of transducers and the use of loops or passages as appropriate depending upon the type of process used, batch or continuous, and the type of nitrocellulose being purified.

The frequency range of the ultrasonic transducers and other details of the ultrasonic system are in accordance with the state of the art as well defined in numerous U.S. patents.

What is claimed is:

1. A process for removing trace sulfuric acid from nitrocellulose fibers comprising:
   dispersing nitrocellulose fibers in water;
   subjecting the nitrocellulose fibers and water dispersion to ultrasonic energy for a time period and at an energy level sufficient to enhance nitrocellulose fibers contact with water and facilitate sulfuric acid dispersal in the water;
   separating waste water containing the traces of sulfuric acid contaminant from the nitrocellulose fibers; and
   recovering purified nitrocellulose fibers.

2. The process of claim 1, wherein the nitrocellulose fibers to be purified are subjected to said ultrasonic energy in purification vessels at a temperature in the range from about 60° to 140° F., at a pressure in the range from ambient pressure to about 15 atmospheres.

3. The process of claim 1, wherein the nitrocellulose fibers are treated with a water-acetone mixture to produce a swelling of the nitrocellulose fibers, contact of said water-acetone mixture with the nitrocellulose fibers being facilitated by said ultrasonic energy.

* * * * *